UNITED STATES PATENT OFFICE.

EDWARD C. THATCHER, OF KANSAS CITY, MISSOURI.

REMEDY FOR HERNIA.

SPECIFICATION forming part of Letters Patent No. 295,078, dated March 11, 1884.

Application filed January 12, 1884. (No specimens.)

*To all whom it may concern:*

Be it known that I, E. C. THATCHER, a citizen of the United States, residing at Kansas City, in the county of Jackson and State of Missouri, have invented certain new and useful Improvements in Topical Remedies for the Relief of Hernia, of which the following is a specification.

My invention has relation to medical compounds to be topically applied for the relief of hernia and the like; and the novelty consists in the preparation and combination of the parts or ingredients, as will be hereinafter more fully described, and particularly pointed out in the claims.

In preparing my improved composition I take of commercial glue, five (5) ounces; honey, two and a half (2½) ounces; boil two and a half hours, and add "A" sugar, five (5) ounces; then add of gutta-percha, dissolved in turpentine, twenty-four (24) grains; boil two and a half hours longer, and add glycerine, three (3) ounces; borax, alum, sulphur, black-lead, and nitrate of potash, of each twenty-four (24) grains; camphor, forty-eight (48) grains, and bitartrate of potash, sixty (60) grains. Boil the whole an hour longer, and then run into suitable molds and cool.

Of course the boiling operation is carried on in a water bath, so as to prevent all danger of overheating or burning the composition.

The molds may be of any desired shape or size, and in practice I have found the size and shape which approximately correspond to the form of an egg divided centrally from point to butt to be preferable. Thus formed, the compound has a convex side and a bottom or plane surface.

In the practical application of this remedy I proceed as follows: I first make a simple copper-zinc element and apply it to the plane surface of the compound, and a piece of sole-leather, corresponding in size, is then placed over the small battery or element above mentioned, and the whole enveloped in one or two sheets of heart-skin (pericardium) or similar membranous substance, neatly applied and properly secured in place, so as to bind the whole securely together. This compound pad is then secured, by screws or otherwise, to a belt or truss, and applied to the ruptured part.

Having thus fully described my invention, what I claim as new and useful, and desire to secure by Letters Patent of the United States, is—

1. An improved medical compound consisting of glue, sugar, honey, gutta-percha, glycerine, borax, alum, sulphur, black-lead, nitrate of potash, bitartrate of potash, and camphor, in or about in the proportions above set forth.

2. A medical compound for the treatment of hernia, consisting of glue, sugar, honey, gutta-percha, glycerine, borax, alum, sulphur, black-lead, nitrate and bitartrate of potash, and camphor, mixed and formed into pads, as above described, and adapted for use in combination with a portable electric element, as and for the purpose set forth.

In testimony whereof I affix my signature in presence of two witnesses.

EDWARD C. THATCHER.

Witnesses:
T. McKINLEY,
O. M. SCHINDEL.